US010310289B2

(12) United States Patent
Le Gros et al.

(10) Patent No.: US 10,310,289 B2
(45) Date of Patent: Jun. 4, 2019

(54) LIGHT ASSEMBLY

(71) Applicant: North Inc., Ontario (CA)

(72) Inventors: Christophe Le Gros, Renens (CH); Lucio Kilcher, Montreux (CH)

(73) Assignee: North Inc., Kitchener, ON (CA)

(*) Notice: Subject to any disclaimer, the term of this patent is extended or adjusted under 35 U.S.C. 154(b) by 0 days.

(21) Appl. No.: 14/433,581

(22) PCT Filed: Oct. 4, 2012

(86) PCT No.: PCT/EP2012/069591
§ 371 (c)(1),
(2) Date: Apr. 3, 2015

(87) PCT Pub. No.: WO2014/053178
PCT Pub. Date: Apr. 10, 2014

(65) Prior Publication Data
US 2015/0226975 A1  Aug. 13, 2015

(51) Int. Cl.
*G02B 27/28* (2006.01)
*G02B 27/48* (2006.01)
(Continued)

(52) U.S. Cl.
CPC ......... *G02B 27/48* (2013.01); *G02B 26/0833* (2013.01); *G02B 26/105* (2013.01);
(Continued)

(58) Field of Classification Search
CPC ........ G02B 27/28; G02B 27/48; G02B 27/18; G03B 2/00; H04N 5/74; H04N 9/31
(Continued)

(56) References Cited

U.S. PATENT DOCUMENTS 5,274,494 A   12/1993  Rafanelli et al.
6,462,873 B1 * 10/2002  Kwok .................. G02B 27/283
                                                    349/9
(Continued)

FOREIGN PATENT DOCUMENTS

JP    H07218909       8/1995
JP    2006-267457    10/2006
(Continued)

OTHER PUBLICATIONS

Machine Translation of JP2008309827A.*
(Continued)

*Primary Examiner* — Steven Whitesell Gordon
*Assistant Examiner* — Jerry L Brooks
(74) *Attorney, Agent, or Firm* — Thomas Mahon

(57) ABSTRACT

According to the present invention there is provided a light assembly, comprising, at least one laser source which is operable to emit a laser beam, and a component for reducing speckle, wherein the component for reducing speckle comprises a block, comprising at least first, second and third surface, and a means for beam splitting, and wherein the first and second reflective means and means for beam splitting are arranged to define an optical path for the second portion of the laser beam whose length is equal to, or greater than, a coherence length of the laser beam which is emitted from the at least one laser source.

26 Claims, 9 Drawing Sheets

(51) Int. Cl.
*G02B 26/08* (2006.01)
*G02B 26/10* (2006.01)
*G02B 27/14* (2006.01)
*H04N 9/31* (2006.01)

(52) U.S. Cl.
CPC ............ *G02B 27/14* (2013.01); *G02B 27/283* (2013.01); *H04N 9/3129* (2013.01); *H04N 9/3161* (2013.01); *H04N 9/3167* (2013.01)

(58) Field of Classification Search
USPC ..................................................... 353/84, 18
See application file for complete search history.

(56) References Cited

U.S. PATENT DOCUMENTS

| | | | |
|---|---|---|---|
| 6,773,120 B2* | 8/2004 | Colpaert | H04N 5/7416 348/771 |
| 6,897,992 B2* | 5/2005 | Kikuchi | G02B 5/1828 345/7 |
| 8,358,456 B2 | 1/2013 | Urakawa et al. | |
| 8,459,804 B2* | 6/2013 | Yoon | G03B 21/28 353/98 |
| 9,249,949 B2 | 2/2016 | Matsubara | |
| 2004/0119949 A1 | 6/2004 | Ito | |
| 2004/0257664 A1* | 12/2004 | Hashimoto | G02B 27/1033 359/636 |
| 2005/0207020 A1* | 9/2005 | Kawamura | G02B 5/3083 359/634 |
| 2006/0082893 A1 | 4/2006 | Nishida | |
| 2008/0174867 A1 | 7/2008 | Kawamura | |
| 2008/0180636 A1* | 7/2008 | Boothroyd | G02B 27/26 353/8 |
| 2009/0190618 A1 | 7/2009 | Kuksenkov et al. | |
| 2009/0252186 A1* | 10/2009 | Pan | H04N 9/3129 372/26 |
| 2011/0134499 A1 | 6/2011 | Konno et al. | |
| 2011/0181838 A1 | 7/2011 | Yokoyama et al. | |
| 2011/0242490 A1 | 10/2011 | Itoh | |
| 2012/0075588 A1 | 3/2012 | Suga | |

FOREIGN PATENT DOCUMENTS

| | | | | |
|---|---|---|---|---|
| JP | 2006267417 | | 10/2006 | |
| JP | 2008-309827 | * | 6/2007 | ............ G02B 27/48 |
| JP | 2008-107521 | | 5/2008 | |
| JP | 2008-112623 | | 5/2008 | |
| JP | 2008-309827 | | 12/2008 | |
| JP | 2008309827 A | * | 12/2008 | ............ G02B 27/48 |
| JP | 2010-122283 | | 6/2010 | |
| KR | 2009-0022421 | | 3/2009 | |
| WO | 2012094011 A1 | | 7/2012 | |

OTHER PUBLICATIONS

Office Action received for Japanese Patent Application No. 2015-534915, dated Mar. 1, 2016, 13 pages including 6 pages English translation.
International Search Report, dated Jul. 16, 2013, Application No. PCT/EP2012/069591, Filed Date: Oct. 4, 2012, pp. 4.
Office Action received for Chinese Patent Application No. 201280076836.9, dated Aug. 19, 2016, 12 pages (untranslated).
Office Action received for Korean Patent Application No. 2015-7008718, dated Jun. 13, 2016, 12 pages including 6 pages English translation.
Office Action received for Japanese Patent Application No. 2015-534915, dated Nov. 1, 2016, 10 pages including 5 pages English translation.
Office Action received for Korean Patent Application No. 2015-7008718, dated Dec. 8, 2016, 12 pages including 6 pages English translation.
Office Action received for Chinese Patent Application No. 201280076836.9, dated Jan. 23, 2018, 11 pages (untranslated).

* cited by examiner

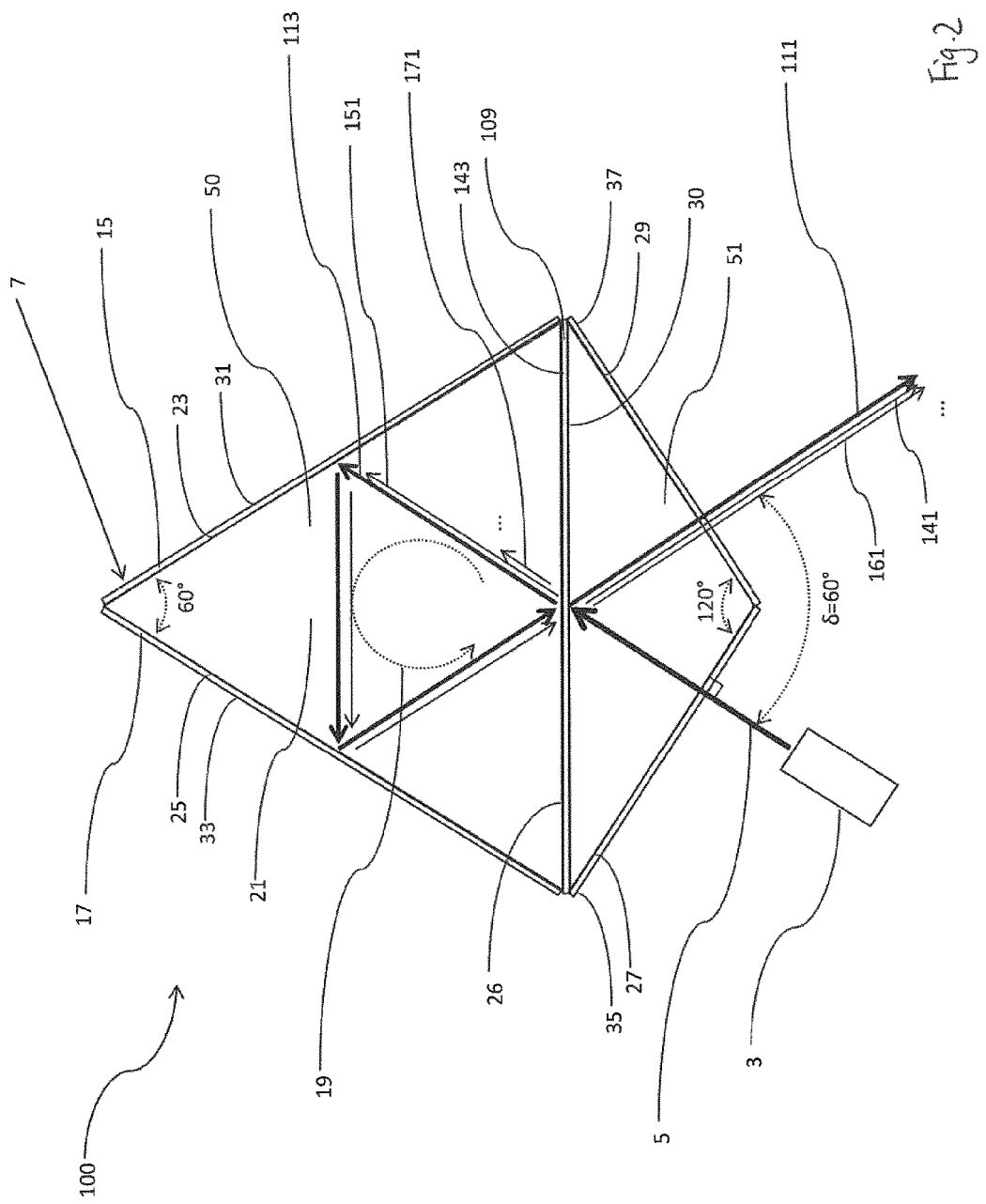

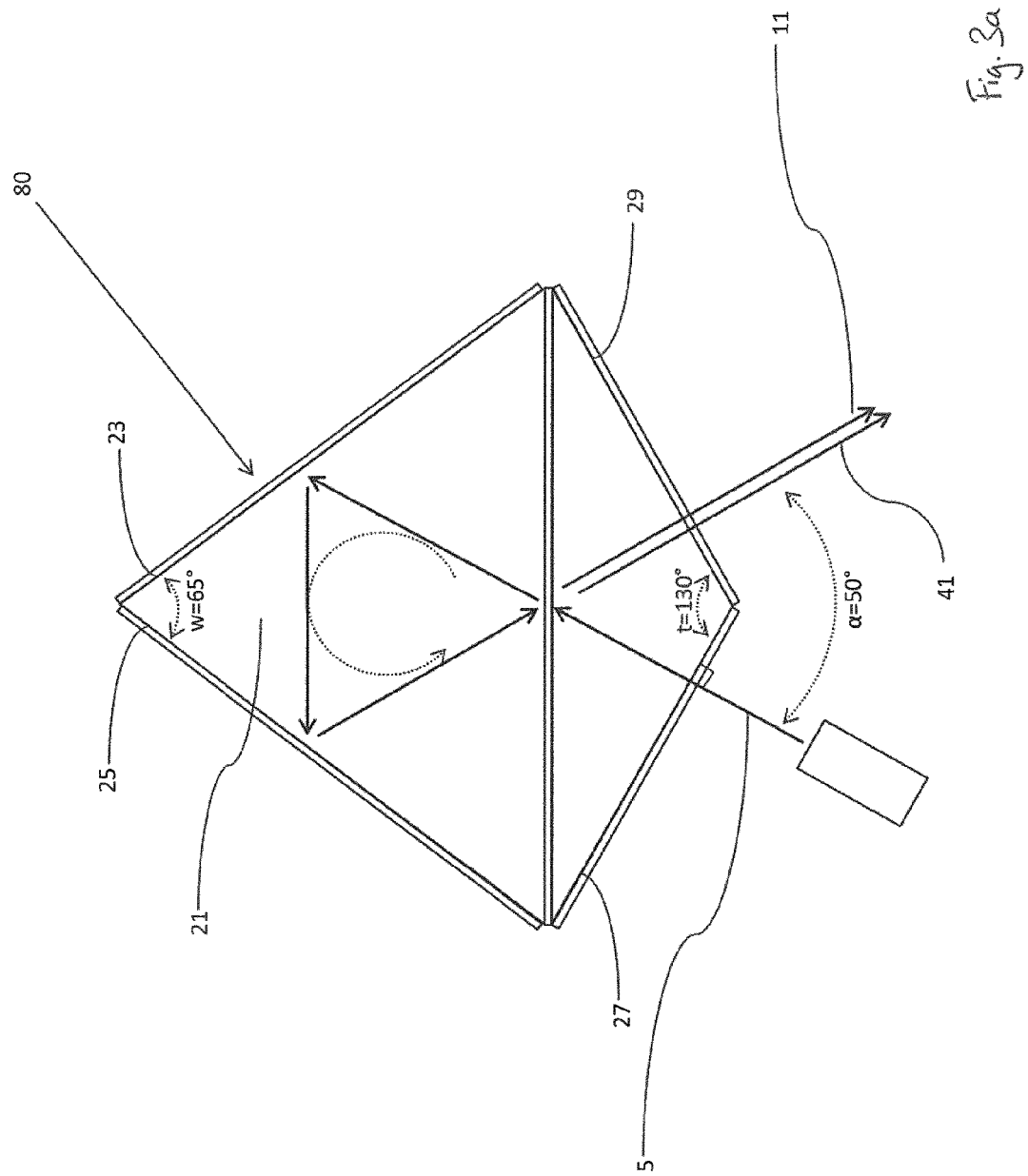

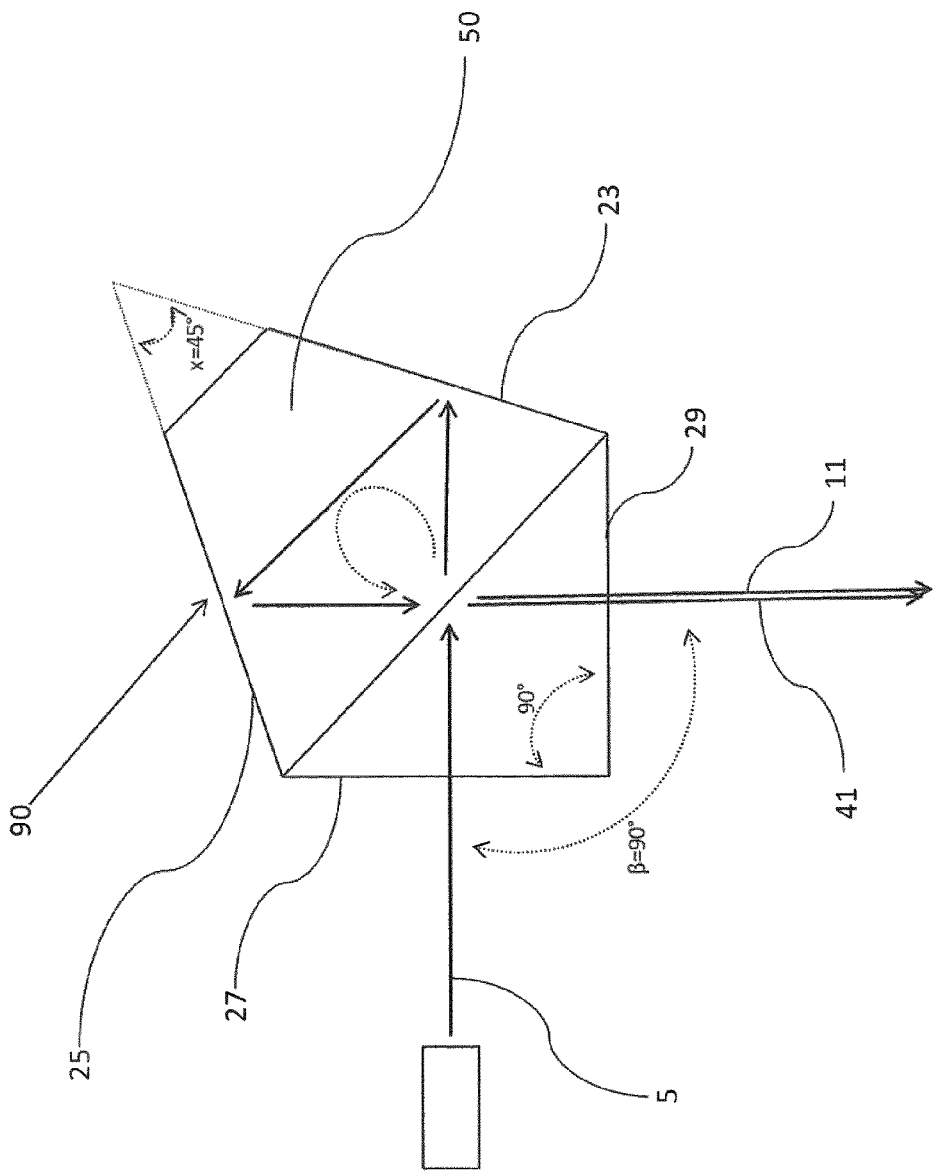

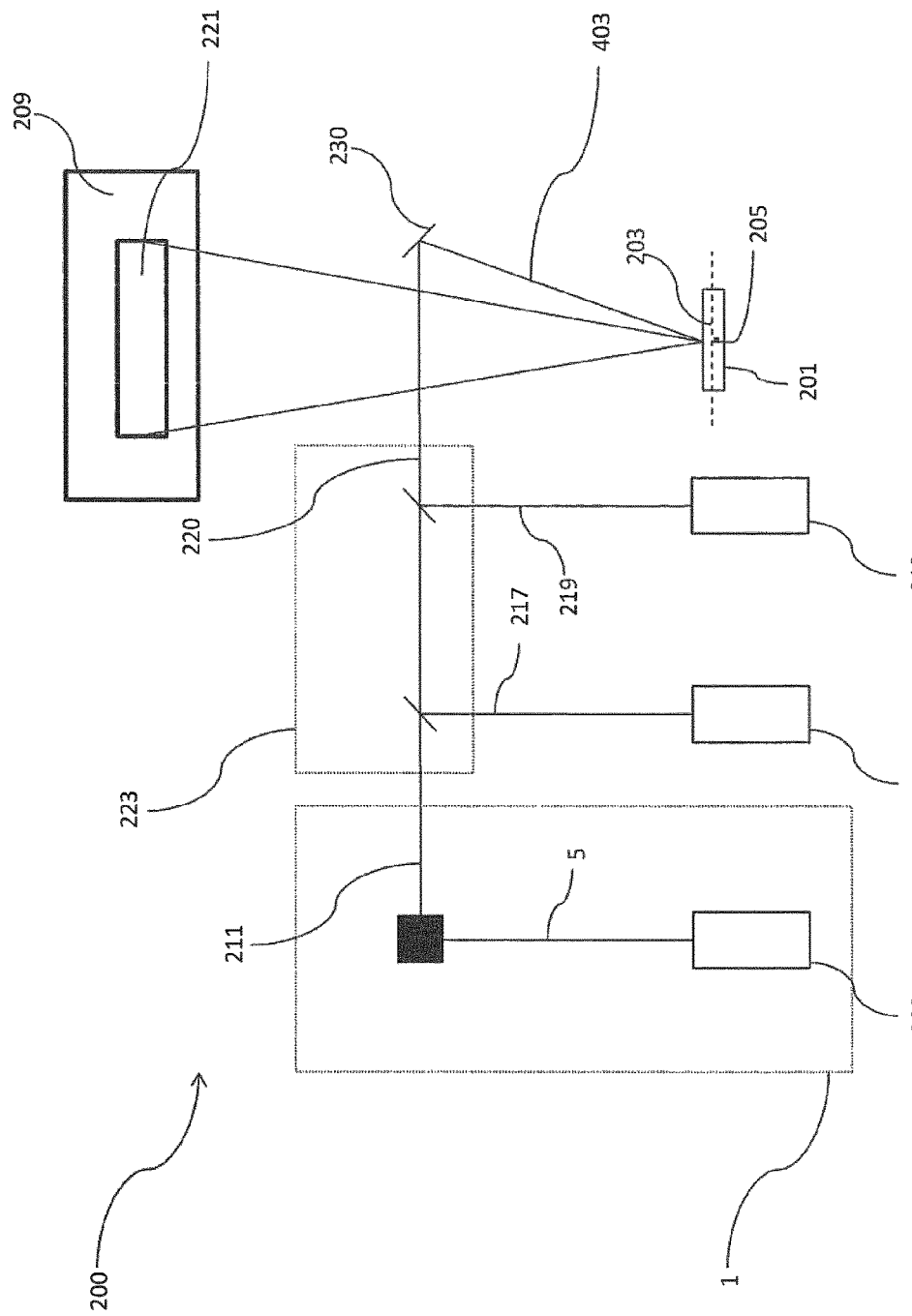

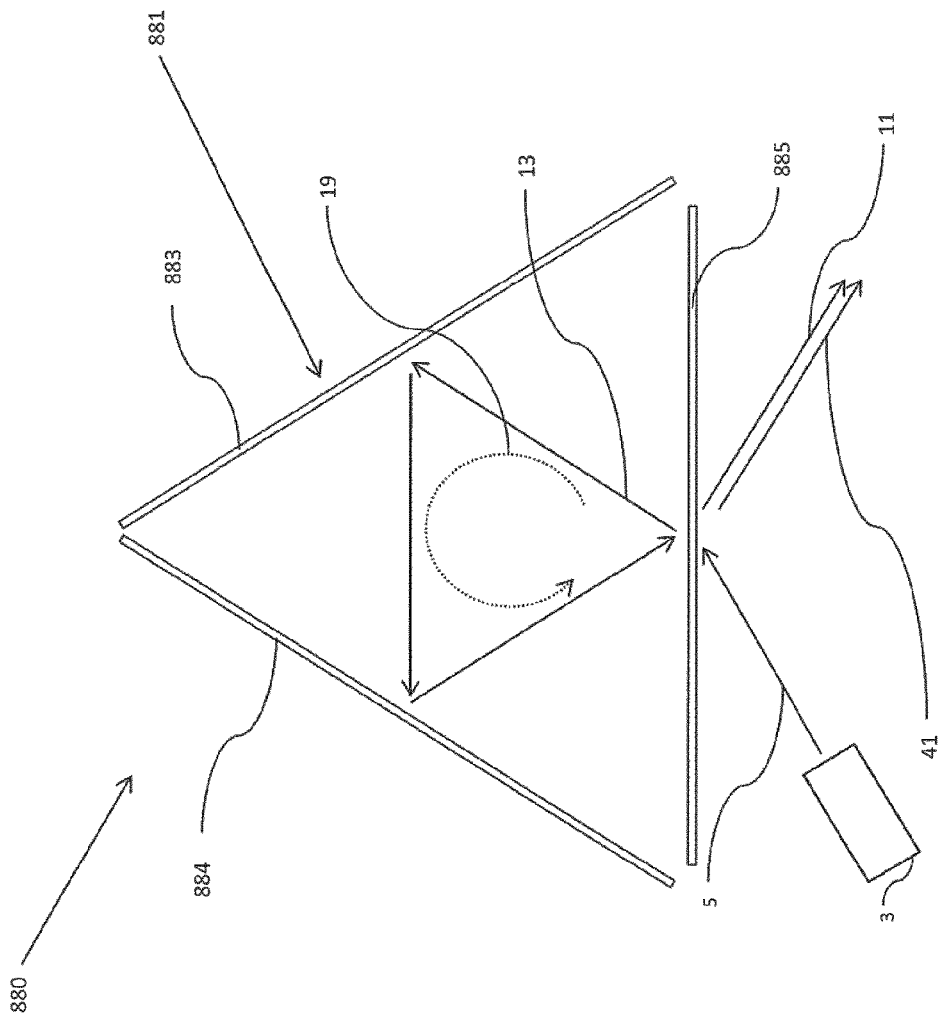

LIGHT ASSEMBLY

FIELD OF THE INVENTION

The present invention concerns a light assembly, and in particular, but not exclusively, a light assembly which uses a block to provide an optical path for a portion of a laser beam whose length is equal to, or greater than, a coherence length of the laser beam, so as to reduce speckle.

DESCRIPTION OF RELATED ART

Speckle is a phenomenon created with light sources, e.g. laser light sources, due to the fact that light is coherent. Parallels and synchronized wavefronts simultaneously hit the projection surface. When the light hits the surface, it creates constructive and destructive interference. The interferences induce an image deterioration that is often visible by human eye and/or by sensors. In addition to a loss of image quality, visual comfort of the viewer may also be affected.

One of the most common ways to reduce speckle is to combine laser beams which have different speckle patterns. Typically this is achieved by overlaying the beam spot (the Gaussian beam intensity distribution at a given intensity) of one laser beam which has a speckle pattern with the beam spots of other laser beams which have different uncorrelated speckle patterns to provide a single beam spot with reduced speckle. Combining the laser beams which have different speckle patterns results in an averaging of the speckle patterns which reduces visible speckle effect.

Laser projection systems are particularly affected by the speckle effect. The speckle effect causes a variation in the intensity with pixel of a projected image. This variation in intensity within each pixel results in a deformed projected image with visual effect of un-sharp edges.

In a projection system, a 2-D image or a video can be displayed on a display surface; each pixel of the 2-D image or a video is generated by combining modulated red, green and blue and/or other wavelength laser light sources, such as UV or IR, by means of, for example, a beam combiner. The combined light from the modulated red, green and blue laser is emitted from the beam combiner as a beam of light. The beam of light emitted from the beam combiner comprises pulses, and each pulse will correspond to a pixel of the 2-D image or a video. One or more MEMS micro-mirrors are used to direct the beam of light to a display screen; the one or more MEMS micro-mirrors will oscillate to scan the beam of light in a zig-zag, unidirectional or bidirectional raster (interlaced or not interlaced) or lissajou pattern across the display screen so that the 2-D image, or a video, is displayed on the display screen, pixel-by-pixel. The MEMS micro-mirror(s) will continuously oscillate to scan light, for example, from left to right and from top to bottom so that each pixel of the 2-D image or a video which is projected onto the display surface, is continuously refreshed. The speed of oscillation of the MEMS micro-mirror is such that a complete 2-D image or a video is visible on the display surface.

For laser projection systems which scan light e.g. MEMS-laser projection systems, reducing speckle is difficult to achieve. This is because speckle occurs in each individual pixel and therefore the steps to reduce speckle must be carried out before the MEMS micro-mirror(s) has oscillated to project the next pixel on the display screen. Since the MEMS micro-mirror must oscillate very fast (so that a complete 2-D image or a video is visible on the display surface), the time period of carrying out steps to reduce speckle is very restricted.

A further challenge is that since such laser projection systems typically use red, green and blue light sources, speckle reduction must be carried out on the laser beams provided by each of the red, green and blue light sources.

A further requirement is that the means for speckle reduction should have little or no light loss. Loss of light will reduce the brightness of the projected image.

Many steps have been taken to reduce the occurrence of speckle in laser projection systems. One prominent method is that disclosed in US patent application US2012/0075588; in this particular patent application the principle is to split two orthogonal polarisations of a laser beam, and to pass direct each polarization along a different length paths; accordingly the two polarisations will provide two different speckle patterns The two different polarisations can each further split to provide a total of four polarisations each with different speckle patterns The contrast ratio provides a measure of speckle pattern. The contrast ratio is given by the formula:

$$\sigma/I$$

Wherein '$\sigma$' is the standard deviation and '$I$' is the mean intensity of the optical light of the image. Speckle reduction is given by the formula:

$$1/\sqrt{N}$$

wherein '$N$' is the number of different uncorrelated speckle patterns of same mean intensity.

Since the method of US2012/0075588 provides two different speckle patterns, the reduction in speckle which is indicated by a reduction of a contrast ratio of 30% ($1/\sqrt{2}$). Such a reduction is insufficient for many applications.

Furthermore, the device disclosed in US2012/0075588 uses quarter-wave plates which are required to change the polarity of the laser beams that pass through them; these quarter-wave plates are very expensive, increase the cost of the device, as well as inducing a lot of optical losses.

It is an aim of the present invention to mitigate or obviate at least some of the above-mentioned disadvantages.

BRIEF SUMMARY OF THE INVENTION

According to the invention there is provided a light assembly comprising, at least one laser source which is operable to emit a laser beam, and a component for reducing speckle, wherein the component for reducing speckle is arranged to receive the laser beam, wherein the component for reducing speckle comprises, a means for beam splitting which is configured to split the laser beam emitted by the laser, by reflecting a first portion of the laser beam and transmitting a second portion of the laser beam; and at least a first and second reflective means, wherein the first reflective means is arranged to receive the second portion of the laser beam from the means for beam splitting and the second reflective means is arranged such that it can direct the second portion of the laser beam back to the means for beam splitting and wherein the first and second reflective means are arranged such that the second portion of the laser beam can be directed from the first reflective means to the second reflective means; and wherein the at least first and second reflective means and means for beam splitting are arranged to define an optical path for the second portion of the laser beam whose length is equal to, or greater than, a coherence length of the laser beam which is emitted from the at least one laser source.

The component for reducing speckle comprises first and second mirror which define the first and second reflective means, wherein the first and second mirrors and a beam splitter plate, wherein each of the first mirror, second mirror and beam splitter plate are mechanically independent of one another such that each of the first mirror, second mirror and beam splitter plate can be moved independently of the one another.

The component for reducing speckle may comprise a block, comprising a first part which has a first, second and third surface, and wherein each of the first and second and third surfaces are in optical communication with the means for beam splitting; and wherein the first surface of the block comprises the first reflective means, and wherein the second surface of the block comprises the second reflective means, and wherein the third surface of the block comprises the means for beam splitting.

Coherence length of a light beam is the propagation distance from a coherent light source (i.e. laser light beam) to a point where the propagated light wave is no longer equal (in term of phase or wavelength) to the initially emitted wave. Within this propagation distance, the wave in questions is most similar to a perfect sinusoidal wave. The coherence length $L_c$ is given by:

$$L_c = (2 \ln(2)\lambda^2)/n\Delta\lambda)$$

where $\lambda$ is the laser's wavelength, $\Delta\lambda$ the spectral width of the source and n the refractive index of the medium.

The means for beam splitting may comprise a coating provided on the third surface of the block. The means for beam splitting may be defined by a coating provided on the third surface of the block The first surface of the first part may comprise a reflective coating which defines the first reflective means and the second surface of the first part comprises a reflective coating which defines the second reflective means.

The light assembly may further comprise a second part which comprises a fourth, fifth and sixth surface, wherein the fourth surface of the second part and fifth surface of the second part are configured to be in optical communication with the means for beam splitting such that a laser beam received by the fourth surface can be passed to the means for beam splitting and laser beams reflected by, or emitted from, the means for beam splitting can be received by the fifth surface of the second part, wherein the fifth surface of the second part is configured to emit laser beams which it receives from the means for beam splitting such that both the first portion of the laser beam which is reflected by the means for beam splitting and at least a part of the second portion of the laser beam which has been transmitted through the means for beam splitting to the first and second reflective means and back through the means for beam splitting, can be emitted through from the block through the fifth surface of the second part.

The fourth and fifth surfaces of the second part of the block may each comprise an anti-reflective coating.

The sixth surface is preferably arranged to abut the third surface of the first part It will be understood that the means for beam splitting may alternatively comprise a coating provided on the sixth surface of the second part of the block. It will be understood that the means for beam splitting may alternatively be defined by a coating provided on the sixth surface of the second part of the block and a coating provided on the third surface of the first part of the block.

The first part of the block is preferably composed of glass. The second part of the block is preferably composed of glass.

The block may comprise glass, PMMA (Poly-methyl-methacrylate), Pyrex, zerodur, borofloat material, polymer, borosilicate crown, dense flint or plastic. The first part and/or second part of the block may comprise glass, PMMA (Poly-methyl-methacrylate), Pyrex, zerodur, borofloat material, polymer, borosilicate crown, dense flint or plastic. The block is preferably made of a material, which enables light to transmit through. It is thus preferred if the material has as less light loss as possible in terms of transmission. Preferably the block comprises SF2 or BK7, which is under the category of glass. The first part and/or second part of the block may comprise SF2 or BK7, which is under the category of glass.

Preferably the first part and second part may cooperate to define a single unit. Preferably the first part and second part cooperate by connecting; i.e. the first part and second part are connected together to form a single unit.

The first and second parts may each be configured to have a triangular cross section or truncated-triangular cross section. Preferably the first and second parts are configured to have a triangular cross section. The triangular cross section is preferably an equilateral triangle. The triangular cross section maybe an isosceles triangle. The path followed by a laser beam directed from the means for beam splitting to the first reflective means, to the second reflective means, and back to the means for beam splitting should be triangular. Depending on the input angle $\alpha$ of the light beam to the block according to the normal, the angle of reflection of the two reflective surfaces should be set to fulfil the equation: $180 = 2\alpha + \beta + \Omega$ where $\beta$ is the angle defined between the input light and reflected light on the first reflective surface and $\Omega$ is the angle defined between the first reflected light and the reflected light on the second reflective surface. Preferably $\beta = \Omega$ corresponding to an optical path forming a isosceles triangle.

The block may be configured such that the first and second parts are changeable; in this manner each of the first and second parts may be selectively exchanged with other first and second parts which have surfaces orientated at different angles i.e. first and second parts which have different dimensions. A user can thus select to use first and second parts which have the appropriate orientated surfaces (i.e. dimensions) which provides a desired direction of laser input and output emission.

The first and second surfaces of the first part may be orientated such at least part of the second portion of the laser beam which has been transmitted, through the means for beam splitting to the first and second reflective means and back through the means for beam splitting, is emitted from the means for beam splitting in the same direction as the direction in which the first portion of the laser beam is reflected by the means for beam splitting, so that said least a part of the second portion of the laser beam and the first portion of the laser beam are emitted from the block in the same direction or in parallel. The block may be shaped or configured such that first and second surfaces are orientated in this way.

The block may be configured, for example shaped, such that there is a predetermined angle between the first and second surfaces to provide a predetermined angle between the first and second reflecting means, so that there is predetermined angle between a laser beam which is incident on the block and a laser beam which is emitted from the block.

The first, second, fourth and fifth surfaces may be orientated such that the first portion of the laser beam and said at least a part of the second portion of the laser beam, can be emitted from the fifth surface of the second part of the block in the same direction and/or parallel.

The block may be configured such that there is a predetermined angle between the first and second surfaces and between the fourth and fifth surfaces so that there is predetermined angle between a laser beam which is incident on the fourth surface of the block and a laser beam which is emitted from the fifth surface of the block. Said first portion of the laser beam and said at least a part of the second portion of the laser beam are laser beams which are emitted from the fourth surface of the block.

Preferably the first portion of the laser beam and said at least a part of the second portion of the laser beam, will be emitted from the fifth surface of the block in the same direction and/or parallel, so there will be a predetermined angle will exist between the light beam which is incident on the fourth surface of the block and each of, the first portion of the laser beam and said at least a part of the second portion of the laser beam.

For example, the block may be configured so that there is a predetermined angle between the first and second surfaces of the block in the first part, and between the fourth and fifth surfaces of the block in the second part, so that light can be emitted from the block at a predetermined angle. The block may be configured to emit light at a predetermined angle for a given angle of incidence on the fourth surface of the block; in such cases the orientation of block relative to the laser source is determined so that the surfaces can be orientated at the appropriate angle.

For example, the block may be shaped so that there is an angle of 60° between the first and second surfaces, and an angle of 120° between the fourth and fifth surfaces; in such a case, provided that a laser beam is incident on the fourth surface at an angle of 90° to the fourth surface then there will be an angle of 60° between a laser beam which is incident on the fourth surface of the block and the laser beam which is emitted from fifth surface of the block. In this case, to achieve the angle of 60° between a laser beam which is incident on the fourth surface of the block and light which is emitted from fourth surface of the block, the block could preferably be arranged relative to the laser source so that the laser beam emitted from the laser source is incident on the fourth surface of the block at an angle of 90°; however it will be understood that the block could be configured to provide the angle of 60° between the incident and emitted a laser beams for any particular angle of incident on the fourth surface of the block.

Likewise, the block may be configured so that there is an angle of 45° between the first and second surfaces, and an angle of 90° between the fourth and fifth surfaces, so that there is an angle of 90° between a laser beam which is incident on the third surface of the block and the laser beams which are emitted from the fifth surface of the block. In this case, to achieve the angle of 90° between a laser beam which is incident on the fourth surface of the block and the laser beams which are emitted from fifth surface of the block, the block should be arranged relative to the laser source so that the laser beam emitted from the laser source is incident on the fourth surface of the block at an angle of 90°; however it will be understood that the block could be configured to provide the angle of 90° between the incident and emitted light beams for any particular angle of incident on the fourth surface of the block.

Likewise, the block may be configured so that there is an angle of 65° between the first and second surfaces, and an angle of 130° between the fourth and fifth surfaces, so that there is an angle of 50° between a laser beam which is incident on the fourth surface of the block and a laser beam which is emitted from fifth surface of the block. In this case, to achieve the angle of 65° between a laser beam which is incident on the fourth surface of the block and light which is emitted from fifth surface of the block, the block should be arranged relative to the laser source so that the laser beam emitted from the laser source is incident on the fourth surface of the block at an angle of 90°; however it will be understood that the block could be configured to provide the angle of 50° between the incident and emitted light beams for any particular angle of incident on the fourth surface of the block.

Preferable the angles between the first and second surfaces is given by $180=2\alpha+\beta+\Omega$ where $\beta$ is the angle defined between the input light and reflected light on the first reflective surface, $\Omega$ is the angle defined between the first reflected light and the reflected light on the second reflective surface and $\alpha$ is the input angle of the light beam to the block according to the normal.

At the manufacturing stage the first part of the block may be shaped so that the desired angles between the first and second surfaces are achieved. At the manufacturing stage the second part of the block may be shaped so that the desired angles between fourth and fifth surfaces are achieved.

The means for beam splitting may comprise dielectrical or hybrid dielectrical material.

The means for beam splitting may be configured to split the laser beam emitted by the laser to provide a first laser beam portion which has a first intensity and a second laser beam portion which has a second intensity. The means for beam splitting may be configured to be a non-polarizing beam splitter. The non-polarizing beam splitter may be a coating. As previously indicated, the non-polarizing beam splitter is preferably provided in the form of a coating provided on the third surface of the first part of the block. The non-polarizing beam splitter is preferably hybrid dielectric coating. The non-polarizing beam splitter may comprise a combination of metal (aluminium, silver or even gold) coating and/or dielectric coating (magnesium fluoride, calcium fluoride, and various metal oxides).

The means for beam splitting may be configured to split the laser beam emitted by the laser to provide a first laser beam portion which has a first polarization and a second laser beam portion which has a second polarization, wherein the first and second polarisations are orthogonal. The means for beam splitting may be configured to be a polarizing beam splitter. The polarizing beam splitter may be a coating. As previously indicated, the polarizing beam splitter is preferably provided in the form of a coating provided on the third surface of the first part of the block. The polarizing beam splitter may comprise dielectric; preferably the polarizing beam splitter is pure dielectric. The polarizing beam splitter preferably comprises layers of materials such as magnesium fluoride, calcium fluoride and various metal oxides.

The means for beam splitting may comprise at least one material selected from the group comprising Al, Au, Ag, $SiO_2$, $TiO_2$, $Al_2O_3$, $Ta_2O_5$, $MgF_2$, $LaF_3$ and $AlF_3$. Alternatively means for beam splitting may comprise any of those metals with alloys.

According to a further aspect of the present invention there is provided a projection device comprising, one or more light assemblies according to any one of the above-mentioned light assemblies, and one or more MEMS mirrors which can oscillate about at least one oscillation axis to scan light which has been emitted from the one or more light assemblies, across a projection screen to project an image on the projection screen.

The one or more light assemblies my each comprise at least three laser sources.

The block of a light assembly may be arranged relative to the at least one laser source, such that laser beams are emitted from the block in a direction which ensures that there is a angle, other than 0° or 180° or 360°, between a laser beam emitted from the at least one laser source and is incident on the block and a laser beam emitted from the block to the MEMS mirror.

The block of a light assembly may be arranged relative to a MEMS mirror, such that laser beams which are emitted from the block are incident on a surface of the MEMS mirror at an angle to the surface of the MEMS mirror which is always greater than half of the angle of oscillation of the MEMS mirror, as the MEMS mirror undergoes full oscillation. Preferably the block of a light assembly is arranged relative to a MEMS mirror, such that laser beams which are emitted from the block are incident on a surface of the MEMS mirror at an angle to the surface of the MEMS mirror which is just above half of the total optical angle of oscillation of the MEMS mirror, as the MEMS mirror undergoes full oscillation. Preferably the block of a light assembly is arranged relative to a MEMS mirror, such that laser beams which are emitted from the block are incident on a surface of the MEMS mirror at an angle to the surface of the MEMS mirror which is between 0.1°-45° greater than, and most preferably between 1°-10°, greater than, half of the total optical angle of oscillation of the MEMS mirror, as the MEMS mirror undergoes full oscillation. The optical angle is preferably twice the mechanical oscillation angle of the MEMS mirror.

In any of the above mentioned projection devices a light assembly may comprise three laser sources and the component for reducing speckle of the light assembly may be arranged to receive laser beams from the three laser sources.

The projection device may comprise at least two further laser sources in addition to the laser sources provided in the one or more light assemblies. For example the light assembly may comprise a laser source which provides a red laser beam, and the projection device may comprise a further two laser sources which are configured to provide a blue and green laser beam respectively. The light assembly in this particular example will emit a red laser beam. However, it will be understood that the light assembly may comprise a laser source which is configured to emit any colour laser beam e.g. blue or green, and/or an Infra-red light and/or UV light. Likewise the two laser sources of the project device may be configured to emit any colour laser beam and/or an Infra-red light and/or UV light. The light beams from each laser source may be combined to define a pixel.

The projection device may further comprise a beam combiner which is configured to combine the laser beams emitted from the one or more light assemblies with the light beams emitted by the at least two further laser sources which are provided in the projection device.

A light assembly in the projection device may further comprise a beam combiner.

A light assembly of the projection device may comprise three laser sources. The component for reducing speckle in a light assembly of the projection device may be arranged to receive laser beams from the three laser sources. The three laser sources may comprise a red, green and blue laser source.

The projection device may comprise at least one other component for reducing speckle, in addition to the component(s) for reducing speckle which is/are provided in the one or more assemblies. For example, the projection device may comprise a single light assembly which comprises a first component for reducing speckle, and the projection device may comprise a second component for reducing speckle. The at least one other component for reducing speckle may have some or all of the features of the afore-mentioned components for reducing speckle.

The least one other component for reducing speckle may be configured to comprise a non-polarizing beam splitter if the component for reducing speckle in the one or more light assemblies is configured to comprise a non-polarizing beam splitter. The second component for reducing speckle maybe configured to comprise a non-polarizing beam splitter means if the component for reducing speckle in the one or more light assemblies is configured to comprise a polarizing beam splitter.

The least one other component for reducing speckle may be configured to output a laser beam to one or more MEMS mirrors which can oscillate about at least one oscillation axis to scan light across a projection screen.

Preferably the least one other component for reducing speckle is arranged such that the one or more MEMS mirrors of the projection device are offset from a central axis of the least one other component for reducing speckle may be configured. Preferably least one other component for reducing speckle may be configured comprises a block having some or all of the features of the afore-mentioned blocks, and the block is arranged such that the one or more MEMS mirrors are offset from a central axis of the block.

Preferably the at least one other component for reducing speckle is configured to receive a laser beam output from a light assembly in the projection device and laser beams output from the two further laser sources provided in the projection device.

The at least one other component for reducing speckle is preferably configured to receive a combined laser beam, wherein the combined laser beam comprises a laser beam output from the light assembly and laser beams output from the two further laser sources.

The projection device may comprise a plurality of other components for reducing speckle, in addition the component(s) for reducing speckle provided in the one or more light assemblies. For example a second, third and more components for reducing speckle may be provided in the projection device. The plurality of other components for reducing speckle may be arranged in a stack. This will result in a greater reduction in speckle. Preferably one component in the stack comprises a polarizing coating and all the other components in the stack comprise non-polarizing coating. Preferably the second components for reducing speckle will comprise a polarising beam splitter and the third and above additional components for reducing speckle will preferably comprise a non-polarizing beam splitter.

In the projection device the block may be arranged such that laser beams which are emitted from the fifth surface of the block, are emitted in a direction which ensures that they are always incident on the surface of the MEMS mirror at an angle to the surface of the MEMS mirror which is always greater than half of the total optical scanning angle of oscillation of the MEMS mirror. If the angle to the surface of the MEMS mirror was less than the angle of oscillation of the MEMS mirror then the projected image would be distorted. Advantageously the angle at which the light beams are incident on the surface of the MEMS mirror can be adjusted by configuring the block to have at least its first and second surfaces at appropriate orientations. The block is designed such that it fits the input versus output angle of the laser beam, the output angle enabling to reach the MEMS mirror with an angle just above the half of its total optical scanning angle. Also the angle at which the light beams are incident on the surface of the MEMS mirror could be adjusted by moving the block; however to decrease the angle of incidence of the laser beam on the MEMS mirror would require that the block be moved further from the MEMS mirror, thus requiring a larger package or housing for the projection device.

The block could be used to direct laser beams which it emits to a MEMS mirror. There may be further provided a method for modifying an existing projection system or projection device, comprising the step of replacing a reflecting means which is used to deflect light emitted from a beam combiner to a MEMS mirror, with a block which has one or more of the above mentioned features. In this way the block could be used to align light beams with the MEMS mirror.

BRIEF DESCRIPTION OF THE DRAWINGS

The invention will be better understood with the aid of the description of an embodiment given by way of example only and illustrated by the figures, in which:

FIG. 2 shows a side view of a light assembly according to a second aspect of the present invention;

FIG. 3a&b shows variations of the blocks which are used in the light assemblies of FIG. 1 and FIG. 2;

FIG. 4 shows a schematic representation of a projection device according to a further aspect of the present invention;

FIG. 8 shows a side view of a light assembly according to a further aspect of the present invention.

DETAILED DESCRIPTION OF POSSIBLE EMBODIMENTS OF THE INVENTION

Figure 1:
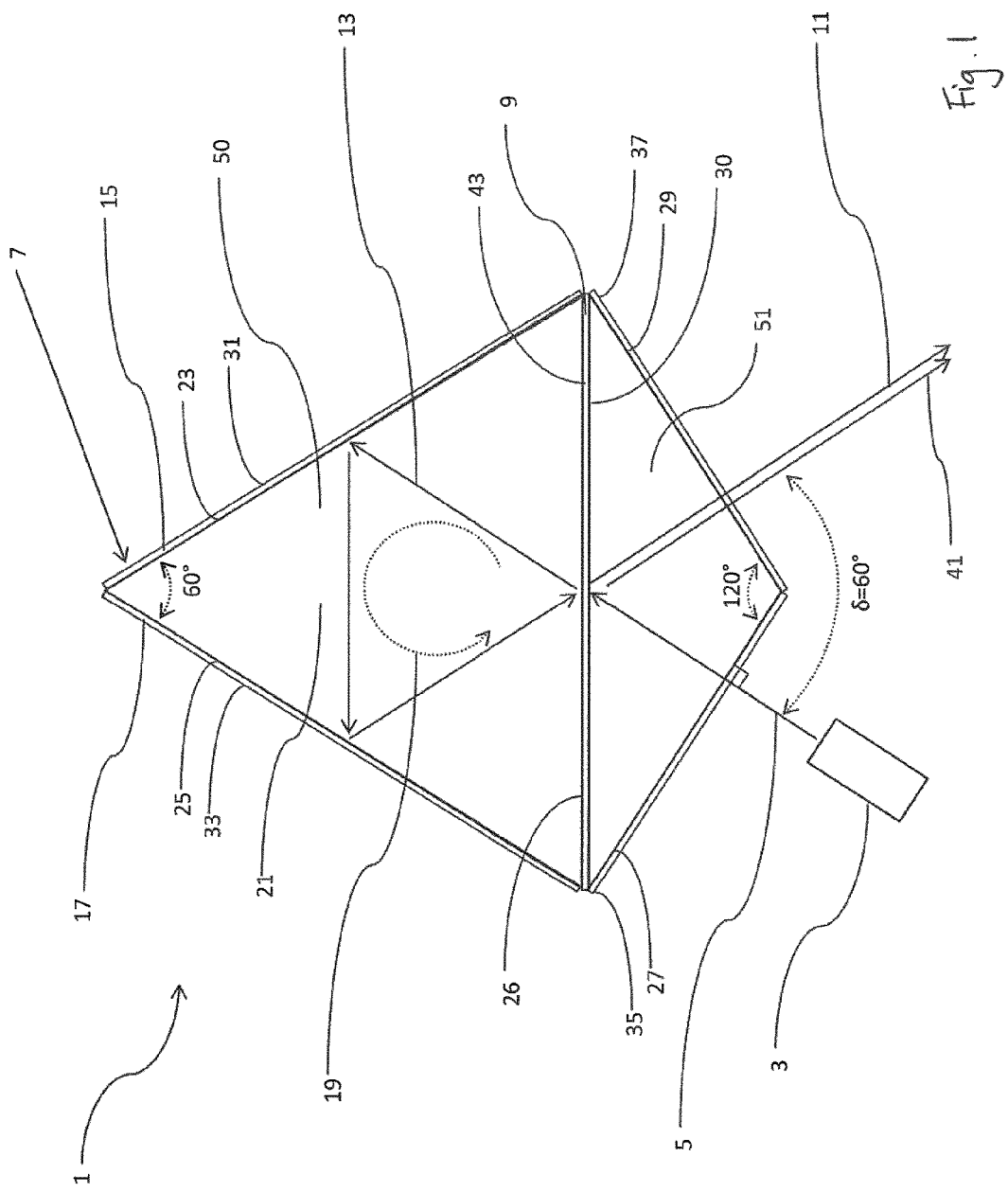
FIG. 1 shows a side view of a light assembly according to a first aspect of the present invention.

FIG. 1 shows a side view of a light assembly 1 according to a first aspect of the present invention. The light assembly 1, comprises, a laser source 3 which is operable to emit a laser beam 5, and a component for reducing speckle 7. The component for reducing speckle 7 is arranged to receive the laser beam 5 from the laser source 3.

The component for reducing speckle 7 comprises a block 21 which is made up of a first part 50, and a second part 51. The first and second parts 50,51 are each configured to have a triangular cross section (alternatively the first and/or second parts 50,51 may comprise a truncated-triangular cross section). The first part 50 comprises three surfaces which define a first 23, second 25 and third 26 surface of the block 21, while the second part 51 comprises three surfaces which define a fourth 27, fifth 29 and sixth 30 surface of the block 21. It will be understood that the second part 51 is an optional feature and the invention can still be carried out when the block comprises a first part 50 only.

The component for reducing speckle 7 comprises, a means for beam splitting 9. In this particular example the means for beam splitting 9 is defined by a coating 43 which is provided on the third surface 26 of the first part 50 of the block 21. Alternatively the means for beam splitting 9 could be a coating provided on the sixth surface 30 of the second part 51. The coating 43 may comprise dielectric materials such as Al, Au, Ag, $SiO_2$, $TiO_2$, $Al_2O_3$, $Ta_2O_5$, $MgF_2$, $LaF_3$ and/or $AlF_3$ such that the means for beam splitting 9 is configured to be a polarizing beam splitter.

The means for beam splitting 9 is configured to split the laser beam 5 emitted by the laser 3, by reflecting a first portion 11 of the laser beam 5 and transmitting a second portion 13 of the laser beam 5. In this particular example the means for beam splitting 9 is configured to be a polarizing beam splitter; that is, the means for beam splitting 9 is configured to split the laser beam 5 emitted by the laser 3 to provide a first laser beam portion 11 which has a first polarization and a second laser beam portion 13 which has a second polarization, wherein the first and second polarisations are orthogonal to one another. Therefore the coating 43 on the third surface 26 of the first part 50 which defines the component for reducing speckle 7 comprises a dielectric material such as, for example, Al, Au, Ag, $SiO_2$, $TiO_2$, $Al_2O_3$, $Ta_2O_5$, $MgF_2$, $LaF_3$ and/or $AlF_3$.

It will be understood that the means for beam splitting is not limited to being a polarizing beam splitter e.g. the means for beam splitting could be a non-polarizing beam splitter. (Of course if the means for beam splitting is non-polarizing, then the beams would be split into beams of different intensities and not into beams of different polarisations).

The component for reducing speckle 7 comprises at least a first and second reflective means 15,17. The first reflective means 15 is arranged to receive the second portion 13 of the laser beam 5 from the means for beam splitting 9. The first and second reflective means 15,17 are arranged such that the second portion 13 of the laser beam 5 can be directed from the first reflective means 15 to the second reflective means 17. The second reflective means 17 is arranged such that it can direct the second portion 13 of the laser beam 5 back to the means for beam splitting 9. This means that the first reflective means 15, located on the first surface 23, can receive light beams from the means for beam splitting 9 and the second reflective means 17, located on the second surface 25, can reflect laser beams it received from the first reflective means 15 back to the means for beam splitting 9. In this particular example the first reflective means 15 and the second reflective means 17 are defined by reflective coatings 31,33 which are provided on the first and second surfaces of the first part 50 of the block 21 respectively. The first and second reflective means 15,17 and means for beam splitting 9 are arranged to define an optical path 19. The first and second reflective means 15,17 and means for beam splitting 9 are arranged such that the length of optical path 19 is greater than a coherence length of the laser beam 5 which is emitted from the laser source 3. Since the first and second reflective means 15,17 and means for beam splitting 9 are provided on the first, second and third surfaces 23,25,26 respectively, the arrangement of these components to provide an optical path 19 which is greater than a coherence length of the laser beam 5, can be achieved by configuring the first part 50 of the block 21 to have the appropriate dimensions e.g. to increase the length of the path 19 a large size first part 50 could be provided.

The first 23, second 25, fourth 27 and fifth 29 surface, of the block 21 are each in optical communication with the means for beam splitting 9 (which is defined by a coating on the third surface of the block). The third 26 and sixth 30 surfaces are also in optical communication with the means for beam splitting 9. The fourth surface 27 of the block 21 is configured to receive the laser beam 5 emitted by the laser source 3 and allow the received laser beam to pass to the means for beam splitting 9. The fifth surface 29 of the block 21 is configured to emit from the block 21 both the first portion 11 of the laser beam 5 which is reflected by the means for beam splitting 9 and at least a part 41 of the second portion 13 of the laser beam 5 which has been transmitted through the means for beam splitting 9, to the first and second reflective means 15,17 and back through the means for beam splitting 9. Each of the fourth 27 and fifth 29 surfaces comprise an anti-reflective coating 35,37.

The first and second surfaces 23,25 are orientated such that the first portion 11 of the laser beam 5 and said at least a part 41 of the second portion 13 of the laser beam 5, can be emitted in parallel in the same direction from the fifth surface 29 of the block 21. This is because the orientation of the first and second surfaces 23,25 will determine the angle at which the first and second reflective means reflect the light beams they receive. It will be understood that the orientation of the fourth and fifth surface could also be utilized to influence the direction in which light is emitted from the block 21; therefore the first, second, fourth and fifth surfaces 23,25,27,29 may be orientated such that the first portion 11 of the laser beam 5 and said at least a part 41 of the second portion 13 of the laser beam 5, can be emitted in parallel in the same direction from the fifth surface 29 of the block 21.

In this particular example the first, second, fourth and fifth surfaces 23,25,27,29 are orientated such that the first portion 11 of the laser beam 5 and said at least a part 41 of the second portion 13 of the laser beam 5, form a predefined angle with the light beam 5 which is incident on the fourth surface 27 of the block 21. For example, in the particular example shown in FIG. 1, the block 21 is shaped so that there is an angle of 60° between the first and second surfaces 23,25, and an angle of 120° between the fourth and fifth surfaces 27,29; as a result, provided that the laser beam 5 from the laser source 3 is incident on the fourth surface 27 at an angle of 90° to the fourth surface 27, then there will be an angle of 60° between the laser beam 5 which is incident on the fourth surface 27 and laser beams 11,41 which are emitted from fifth surface 29 of the block 21. In this case, to achieve the angle δ of 60° between the laser beam 5 which is incident on the fourth surface 27 of the block 21 and the laser beams 11,41 which are emitted from fifth surface 29 of the block 21, the block 21 should be arranged relative to the laser source 3 so that the laser beam 5 emitted from the laser source 3 is incident on the fourth surface 27 of the block 21 at an angle of 90°. However it will be understood that the block 21 could be configured to provide the angle of 60° between the incident and emitted laser beams for any particular angle of incident on the fourth surface 27 of the block 21. Preferably the block 21 is shaped at the manufacturing stage so that the desired angles between the surfaces 23,25,27,29 are provided. It should be understood that a predefined angle between the light beam 5 which is incident on the fourth surface 27 of the block 21 and the light beams 11,41 which are emitted from the block 21 could be achieved by orientating the first and second surfaces 23,25 only in an appropriate orientation.

The first part 50 and second part 51 are arranged such that the sixth surface 30 of the block 21 (provided by a surface of the second part 51) abuts the coating 43 provided on the third surface 26 of the first part 50. In this manner the first part 50, second part 51 and means for beam splitting 9, form a single unit. The first part and second parts 50,51 may be secured together in their abutted position.

The block 21 may be configured such that the first and/or second parts 50,51 are changeable with other first and/or second parts 50,51 which have different dimensions e.g. different angles between the first and second surfaces 23,25, and/or between the fourth and fifth surfaces 27,29. A user can thus, for example, select to use first and second parts 50,51 which have the appropriate orientated surfaces which provide a desired angle between the laser beams which are incident to the block 21 and the laser beams emitted 11,41 from the block 21.

During use the laser source 3 is operated to emit a laser beam 5. The block 21 is orientated so that the laser beam 5 is incident on the fourth surface 27 of the block. In particular, for this example, the block 21 is orientated so that the laser beam 5 is incident at 90° to fourth surface 27 of the block 21.

The light beam 5 passes through the fourth surface 27, into the block 21, and onto the means for beam splitting 9 (i.e. coating 43 provided on the third surface of the first part 50). The means for beam splitting 9 splits the light beam 5 into a first laser beam portion 11 which has a first polarization and a second laser beam portion 13 which has a second polarization, wherein the first and second polarisations are orthogonal to one another.

The first laser beam portion 11 is reflected by the means for beam splitting 9 to the fifth surface 29 of the block 21. The first laser beam portion 11 is subsequently emitted from the block 21 through the fifth surface 29.

The second laser beam portion 13 which is transmitted through the means for beam splitting 9 (i.e. emitted beam 41), will be emitted from the block 21 through the fifth surface 29. The emitted beam 41 will be emitted the fifth surface 29, in the same direction as the first laser beam portion 11. Since the second laser beam portion 13 will have passed along the optical path 19, and since the optical path 19 has a length which is greater than the coherence length of the laser beam 5, the emitted beam 41 will be delayed with respect to the first laser beam portion 11. As a result, there will be difference between the phase of the emitted beam 41 and first laser beam portion 11, when they are emitted from the fifth surface 29 of the block 21; this will result in a reduction in speckle. Notably, unlike the devices used in the prior art, no quarter-wave plates are required to achieve a reduction in speckle because no polarization change is required here to split the laser beam and recombine them in the same direction. Simple reflection only is used to recollimate the beams, that were initially split using the polarized beam splitter, together FIG. 2 shows a side view of a light assembly 100 according to a second aspect of the present invention. The light assembly 100 shown in FIG. 2 has many of the same features as the light assembly 1 shown in FIG. 1 and like features are awarded the same reference numbers.

In the light assembly 100 comprises a means for beam splitting 109 which is configured to be a non-polarizing beam splitter; that is the means for beam splitting 109 is configured to split the laser beam 5 emitted by the laser 5 to provide a first laser beam portion 111 which has a first intensity and a second laser beam portion 113 which has a second intensity. As was the case for the assembly shown in FIG. 1, the first laser beam portion 111 is reflected by the means for beam splitting 109 and the second laser beam portion 113 is transmitted through the means for beam splitting 109 to be passed along the optical path 19. When the second laser beam portion 113 is passed back to the means for beam splitting 109, it will be split again with part 141 of the second laser beam portion 113 which has a first intensity being transmitted through the means for beam splitting 109 and the other part 151 of the second laser beam portion 113 which has another intensity being passed back along the optical path 19. When the laser beam portion 151 goes into the optical loop 19, it will split again with part 161 of the laser beam portion 151 which has one intensity being transmitted through the means for beam splitting 109 and the another part 171 of the laser beam portion 151 which has another intensity being passed back along the optical path 19. Continuous looping of the light beam will occur with part of the beam being transmitted through the means for beam splitting and another part of the beam being passed back into the optical loop 19 once again. All of the light beams 141,161 which are emitted from the means for beam splitting 109 will each be emitted in the same direction and/or parallel from the fourth surface 29 of the block 21. There will be an infinite number of light beams 141,161,111 output from the fourth surface 29 of the block 21 this is due to the infinite looping of light beams in optical loop 19. The light beams 141,161,111 output from the fourth surface 29 of the block 21 will be collimated together. This is primarily due to the means for beam splitting 109 which is configured to be a non-polarizing beam splitter.

As was the case for the assembly shown in FIG. 1, the means for beam splitting 109 is defined by a coating 143 which is provided on the third surface 26 of the first part 50 of the block 21. The coating 143 may comprise a hybrid dielectric material so that the means for beam splitting 109 is configured to be a non-polarizing beam splitter. The non-polarizing beam splitter may comprise a combination of metal (aluminium, silver or even gold) coating and/or dielectric coating (magnesium fluoride, calcium fluoride, and various metal oxides).

The light assembly 100 shown in FIG. 2 operates in the same manner as the assembly 1 of FIG. 1, and offers the same advantages; except that the means for beam splitting 109 splits laser beams into laser beams of different intensities rather than into laser beams which have different polarizations. The light assembly 100 offers the additional advantage in that non-polarising beam splitters are cheaper than polarising beam splitters, thus the light assembly 100 is cheaper to manufacture compared to light assembly 1 shown in FIG. 1. The assembly of FIG. 1 shows two output beams recollimated with an optical path difference longer than the coherence length of the laser beam, achieving a speckle reduction of at most 30% if the two polarization components are of same quantities. By controlling the ratio between the two polarization, the light intensity between the two output beams can be controlled. By doing so, there will be less speckle reduction but more control over the amount of reduced speckle. The assembly 100 shown in FIG. 2 shows a theoretical output of an infinity of laser beams each with an additional optical path difference longer than the coherence length of the laser source. So speckle reduction will be more important as there is more uncorrelated speckle as an output in comparison with the assembly of FIG. 2. Furthermore, according to the means for beam splitting 109 i.e. the ratio of light intensity split given, the intensity between the output beams can be controlled and thus the amount of reduced speckle can be reduced as well (up to 43%).

In each of the embodiments previously described the first, second, fourth and fifth surfaces 23,25,27,29 are arranged so that angle of 60° exists between the laser beam 5 incident on the fourth surface 27 of the block 21 and the laser beams 11,41,111,141,171 emitted from the fifth surface 29 of the block 21. However, it will be understood that the first, second, fourth and fifth surfaces 23,25,27,29, may be orientated at any angle to achieve any desired angle between laser beams incident to and emitted from the block 21. FIGS. 3a and 3b show blocks 80,90 which has first, second, fourth and fifth surfaces 23,25,27,29, orientated at different angles to achieve a different angle α, β between incident light beams 5 and emitted light beams 11,41. The blocks 80,90 may comprise some or all of the features of the block 21 used in the light assemblies 1,100 shown in FIGS. 1 and 2 respectively.

FIG. 3a shows a block 80 which is configured so that there is an angle 'w' of 65° between the first and second surfaces 23,25, and an angle 't' of 130° between the fourth and fifth surfaces 27,29, so that an angle 'α' of 50° between the laser beam 5 which is incident on the fourth surface 27 and the laser beams 41,11 which are emitted from fifth 29 surface of the block 21.

FIG. 3b shown that the block may be configured so that there is an angle 'x' of 45° between the first and second surfaces 23,25, and an angle of 90° between the fourth and fifth surfaces 27,29, so that there is an angle of 90° between the laser beam 5 which is incident on the fourth surface 27 of the block 90 and the laser beams 11,41 which are emitted from the fifth surface 29 of the block 90. It is also worth noting that the first part 50 of the block 90 is configured to have a truncated-triangular cross section.

FIG. 4 shows a schematic representation of a projection device 200 according to a further aspect of the present invention. The projection device 200 comprises a light assembly 1 as shown in FIG. 1. It will be understood that the projection device 200 may additionally or alternatively comprise a light assembly 100 as shown in FIG. 2. The projection device 200 further comprises a MEMS mirror 201 which can oscillate about two orthogonal oscillation axes 203,205 to scan light 403 which it receives.

The projection device 200 has two further laser sources 211,213 which are configured to provide green and blue laser beams 217,219 respectively. The light assembly 1 in this particular example comprises a laser source 3 which is configured to emit a red laser beam 5. However, it will be understood that the light assembly 1 may comprise a laser source which is configured to emit any colour laser beam e.g blue or green. Likewise the two laser sources of the project device may be configured to emit any colour laser beam and/or an Infra red laser beam and/or a UV laser beam.

The projection device 200 further comprises a beam combiner 223 which is configured to combine the red laser beams 211 emitted from the light assembly 1 with the green and blue laser beams 217,219 emitted by the two further laser sources 211,213 to provide a combined light beam 220. The light beams 211,217,219 are combined to define pixels of an image which is to be projected. The beam combiner 223 in this particular example comprises a green dichroic plate and blue dichroic plate 225,227.

The combined light beam 220 which is output from the beam combiner 223 is directed, via an intermediate mirror 230 to the MEMS mirror 201. The MEMS mirror 201 is operated to oscillate about its two orthogonal oscillation axes 203,205 to scan combined light beam 220 across the display screen 209 to project pixels which define the image 221.

Figure 5:
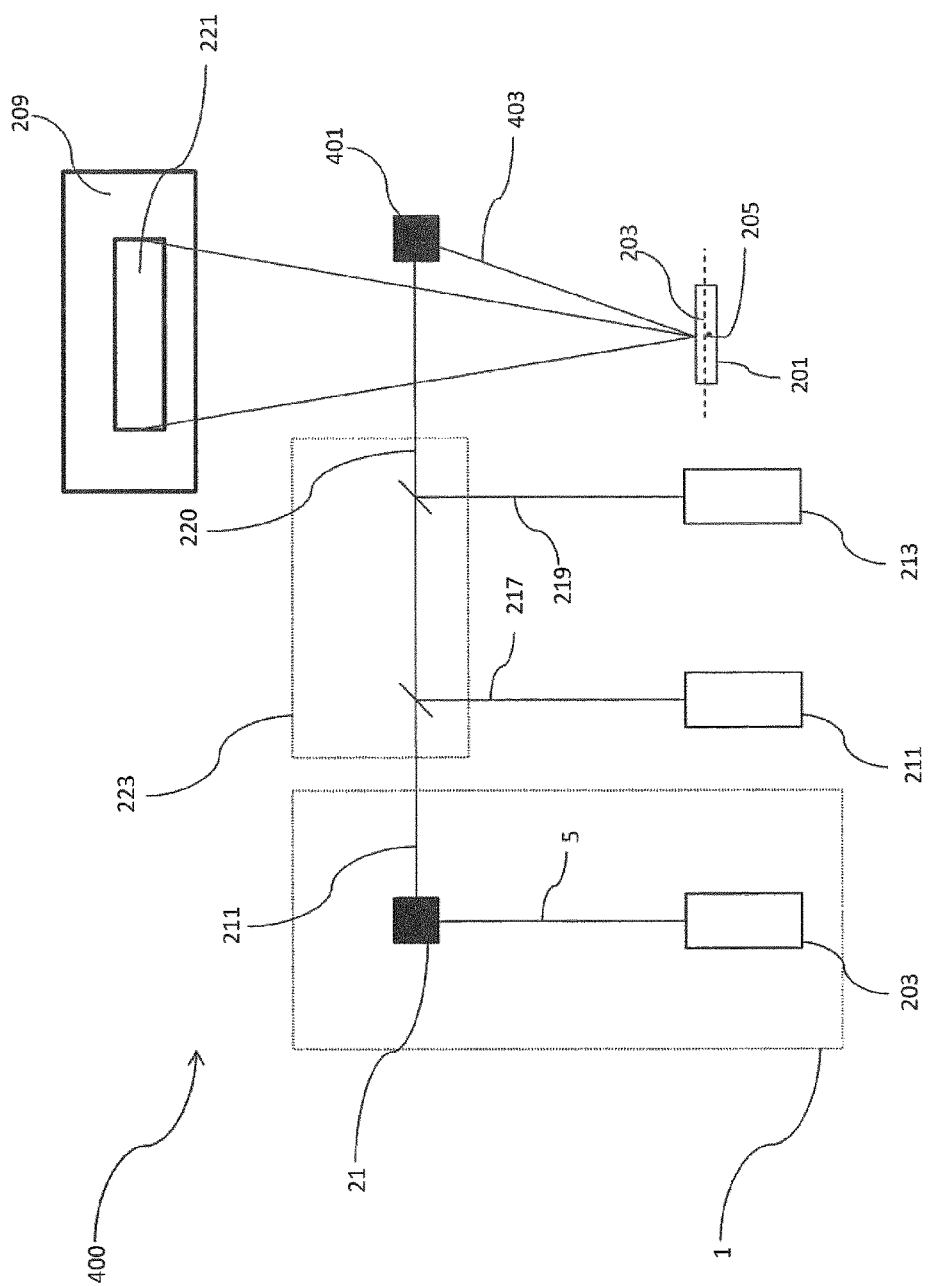
FIG. 5 shows a schematic representation of a projection device according to a further embodiment of the present invention.

FIG. 5 shows a schematic representation of a projection device 400 according to a further embodiment of the present invention. The projection device 400 has many of the same features as the projection device 200 shown in FIG. 4 and like features are awarded the same reference numbers.

The projection device 400 comprises a second component for reducing speckle 401 in the form of a second block 401. The second block 401 may have some or all of the features of the blocks 21,80,90 discussed earlier. Preferably the means for beam splitting 9,109 in the second block is different to that provided in the block 21 of the light assembly 1. In this particular example, since the light assembly 1 comprise a block 21 which comprises a polarising beam splitter, the second block 401 is configured to comprise a non-polarizing beam splitter. It will be understood that if the light assembly was a light assembly 100 according to that shown in FIG. 2 (i.e. having a non-polarizing beam splitter), then the second block 401 would preferably be configured to comprise a non-polarizing beam splitter.

The second block 401 is arranged to receive the combined laser beam 220 output from beam combiner 223 and to output laser beams 403 to the MEMS mirror 201 which can oscillate about it two orthogonal oscillation axis 203,205 to scan the laser beam across a projection screen 209 so that an image 221 is projected.

The second block 401 is arranged such that it is are offset from the MEMS mirror 201 so as to ensure that the second block 401 does not obstruct light beams which are reflected by the MEMS mirror 201 to the display screen 209. Preferably the second block 401 is arranged so that the MEMS mirror 201 is offset from a central axis of the block 401.

The second block 401 is further arranged such that laser beams 403 which are emitted from the fifth surface 29 of the second block 401, are emitted in a direction which ensures that there is a angle other than 0° or 90° or 180° between the combined laser beam 220 incident on the third surface 27 of the second block 401 and laser beams 403 which are emitted from the fifth surface 29 of the second block 401.

Additionally the block 401 of a light assembly is arranged relative to a MEMS mirror 201, such that laser beams which are emitted from the block 401 are incident on a surface of the MEMS mirror at an angle to the surface of the MEMS mirror which is always greater than half of the angle of oscillation of the MEMS mirror, as the MEMS mirror undergoes full oscillation.

Figure 6:
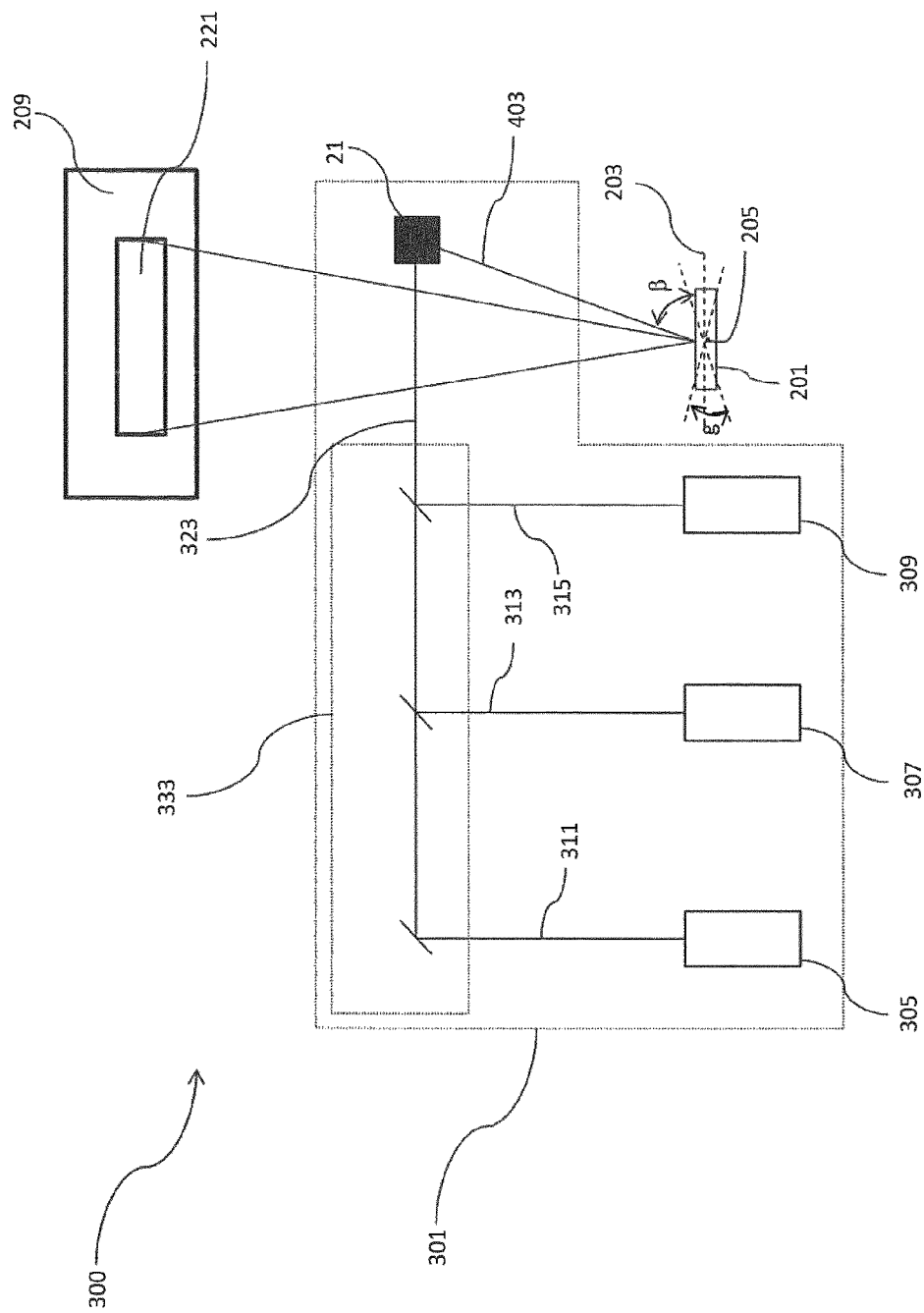
FIG. 6 shows a schematic representation of a projection device according to a further embodiment of the present invention.

FIG. 6 shows a schematic representation of a projection device 300 according to a further embodiment of the present invention. The projection device 300 comprises a light assembly 301 which is similar to that shown in FIG. 1 except that three laser sources 305,307,309 are provided in the light assembly 301. The three laser sources 305,307,309 are configured to provide a red, green and blue laser beams 311,313,315 respectively. The light assembly 301 further comprises a beam combiner 333 which is configured to combine red, green and blue laser beams 311,313,315 to provide a combined laser beam 323; the combined laser beam 323 is passed to the block 21.

The laser beams emitted from the block 21 are directed to the a MEMS mirror 201 which can oscillate about two orthogonal oscillation axis 203,205 to scan light which has been emitted from the light assembly 301, across a projection screen 209.

In this particular example the block 21 is arranged such that laser beams which are emitted from the fifth surface 29 of the block, are emitted in a direction which ensures that they are always incident on the surface of the MEMS mirror 201 at an angle β to the surface of the MEMS mirror 201 which is always greater than half of the angle of oscillation of the MEMS mirror 201, as the MEMS mirror 201 undergoes oscillation. If the angle β to the surface of the MEMS mirror 201 was less than the angle of oscillation 'g' of the MEMS mirror 201 then the projected image would be distorted. Advantageously the angle at which the light beams are incident on the surface of the MEMS mirror 201 can be adjusted by configuring the block 21 to have at least its first and second 23,25 (and optionally it third 26 and fourth 30 surfaces) to have the appropriate orientations. The angle at which the light beams are incident on the surface of the MEMS mirror 201 could be adjusted by moving the block 21 however to decrease the angle of incidence would require that the block 21 be moved further from the MEMS mirror 201, thus requiring a larger package or housing for the projection device 300.

The block 21 is positioned at a angle other than 90° between the combined laser beam 323 incident on the third surface 27 of the block 21 and light beams emitted from the fourth surface 29 of the block 21. This will reduce distortion in a projected image.

Figure 7:
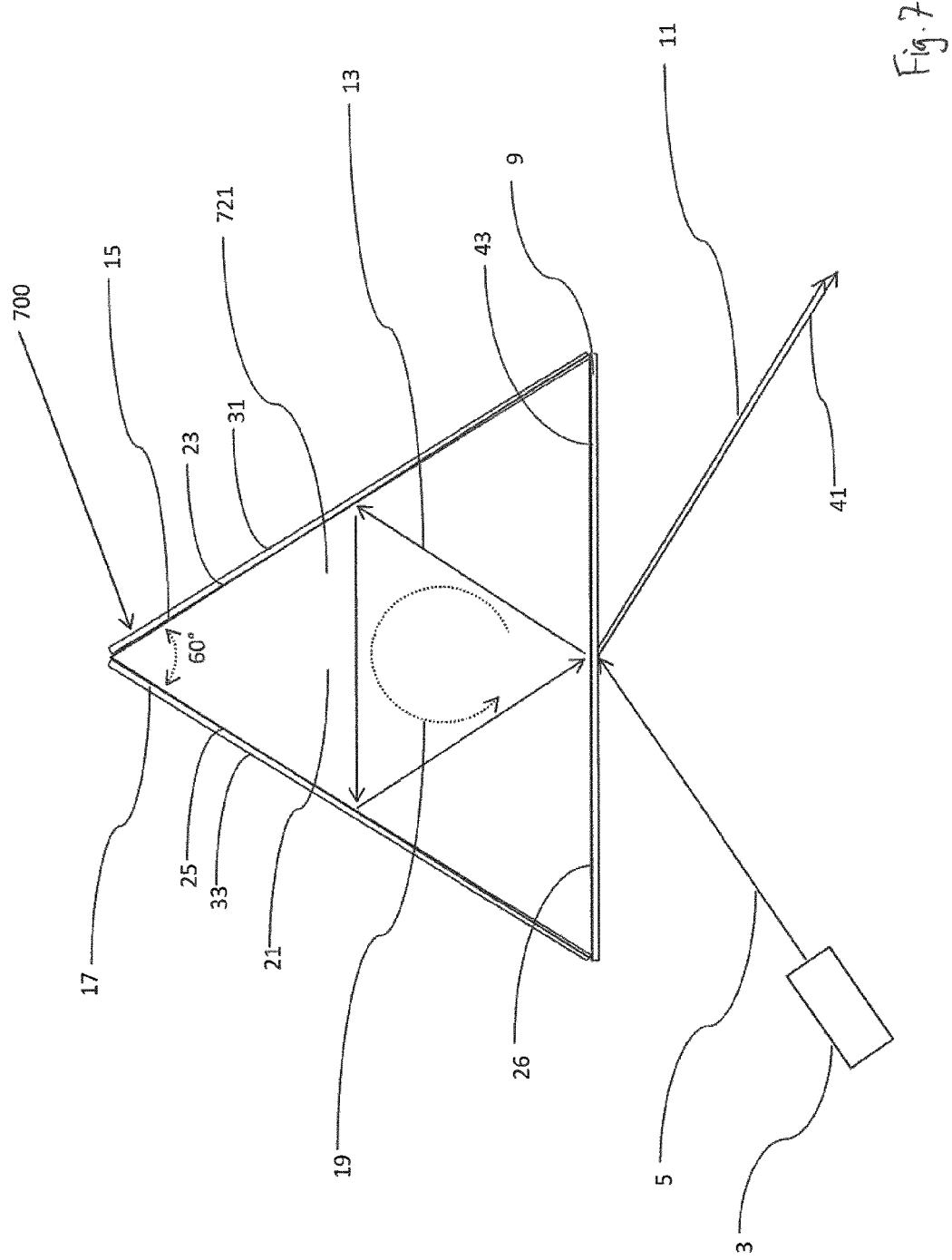
FIG. 7 shows a side view of a light assembly according to a further aspect of the present invention.

FIG. 7 shows a light assembly 700 according to a further embodiment of the present invention. The light assembly has many of the same features of the light assembly 1 shown in FIG. 1 and like features are awarded the same reference numbers.

Unlike the light assembly 1 shown in FIG. 1 light assembly 700 comprises block 721 which consists of the first part 50 only. The surfaces of the first part 50 defines the first, second and third surfaces 23,25,26; the first part 50. Light beams 5 are incident on the block 21 and light beams 41,11 are emitted from the block 721 through the third surface 26.

The means for beam splitting 9 is configured to be a coating 43 provided on the third surface 26 of the first part 50. The coating 43 may comprise dielectric Al, Au, Ag, $SiO_2$, $TiO_2$, $Al_2O_3$, $Ta_2O_5$, $MgF_2$, $LaF_3$ and/or $AlF_3$ (common dielectric materials) such that the means for beam splitting 9 is configured to be a polarizing beam splitter. Alternatively the coating 43 may be configured to be a non-polarizing beam splitter.

As was the case of the light assembly 1 shown in FIG. 1, in the light assembly 700 the angle between the laser beam 5 which is incident on the block 721 and the laser beams 41,11 which are emitted from the block 721 is dictated by the orientations of the first and second reflective means 31,33 which is dictated by the orientation of the first and second surfaces 23,25 since the first and second reflective means 31,33 are defined by coatings on the first and second surfaces 23,25.

The light assembly 700 operates in a similar fashion the light assembly 1 shown in FIG. 1.

FIG. 8 provides a side view of a light assembly 880, according to the present invention. The light assembly 880 comprises a laser source 3 which is operable to emit a laser beam 5, and a component for reducing speckle 881. The component 881 for reducing speckle is arranged to receive the laser beam 5.

In this particular embodiment the component 881 for reducing speckle is defined by three discrete elements, namely, a first and second mirror 883,884 (which define a first and second reflective means respectively), and a beam splitter plate 885 (which defines a means for beam splitting). The beam splitter plate 885 may be configured to be a polarising beam splitter or a non-polarising beam splitter. Furthermore the beam splitter plate 885 could be defined by a coating provided on an optical component. It will be understood that the beam splitter plate 885 may be momochromatic or may be polychromatic. It will also be understood that the beam splitter plate 885 could be configured to have any suitable shape, for example it could be configured to have a triangular cross section; preferably the beam splitter plate 885 will be configured to be a planar structure. Preferably, if the beam splitter plate 885 is configured to be momochromatic, then it will be a planar structure; if the beam splitter plate 885 is configured to be polychromatic then it will have a triangular cross section. A beam splitter plate 885 which is configured to be polychromatic can output collimated beams independently of the wavelengths of the light which are incident on the beam splitter plate 885. Each of the first mirror 883, second mirror 884 and beam splitter plate 885 are mechanically independent of one another such that they can each be moved and positioned independently of the one another.

A beam splitter plate 885 is configured to split the laser beam 5 emitted by the laser 3, by reflecting a first portion 13 of the laser beam and transmitting a second portion 11 of the laser beam.

The first mirrors 883 is arranged to receive the second portion 13 of the laser beam from the beam splitter plate 885 and the second mirror 884 is arranged such that it can direct the second portion 13 of the laser beam back to the beam splitter plate 885. The first and second mirrors 883,884 are arranged such that the second portion 13 of the laser beam can be directed from the first mirrors 883 to the second mirror 884. The first and second mirror 883,884 and beam splitter plate 885 are arranged to define an optical path 19 for the second portion 13 of the laser beam whose length is equal to, or greater than, a coherence length of the laser beam 5 which is emitted from the at least one laser source 3.

The optical assembly 880 operates in a similar fashion to the optical assembly 1 shown in FIG. 1.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. An apparatus to reduce speckle, comprising:
   a first part comprising a first surface, a second surface, and a third surface, the first surface, the second surface, and the third surface arranged in optical communication with each other, the first and the second surfaces arranged to form an angle of 60 degrees between them;
   a second part comprising a fourth surface, a fifth surface, and a sixth surface, the sixth surface in optical communication with the fourth and fifth surfaces, the fourth and the fifth surfaces arranged to form an angle of 120 degrees between them; and
   a beam splitting plate disposed between the third surface and the sixth surface, the beam splitting plate to split an incident laser beam by reflecting a first portion of the laser beam and transmitting a second portion of the laser beam, the sixth surface to transmit the laser beam to the beam splitting plate and to transmit the second portion of the laser beam to the fifth surface, the third surface to transmit the second portion of the laser beam to the first surface,
   the first surface to define a first mirror arranged to receive the second portion of the laser beam from the beam splitting plate and reflect the second portion of the laser beam to the second surface;
   the second surface to define a second mirror arranged to receive the second portion of the laser beam from the first mirror and to direct the second portion of the laser beam to the third surface, the first and the second mirrors and the third surface arranged to define an optical path for the second portion of the laser beam with a length equal to, or greater than, a coherence length of the laser beam,
   the fourth surface to receive the laser beam and communicate the laser beam to the sixth surface, and
   the fifth surface to receive the second portion of the laser beam from the sixth surface and to receive the first portion of the laser beam from the third surface, an orientation between the first and second surface and between the fourth and fifth surfaces such that the first portion of the laser beam is transmitted through the fifth surface in parallel to the second portion of the laser beam.

2. The apparatus of claim 1, at least two of the first mirror, the second mirror, and the beam splitting plate can be moved independently of the one another.

3. The apparatus of claim 1, the third surface to comprise a coating to define the beam splitting plate.

4. The apparatus of claim 1, the first surface and the second surface to comprise a coating to define the first and the second mirrors, respectively.

5. The apparatus of claim 1, wherein the first part and the second part are each configured to have a triangular cross section, or a truncated-triangular cross section.

6. A projection device, comprising:
   a light assembly to emit light; and
   one or more microelectromechanical system (MEMS) mirrors to oscillate about at least one oscillation axis to scan the light emitted from the light assembly across a projection screen to project an image on the projection screen, the light assembly comprising:
   at least one laser source operable to emit a laser beam;
   a first part comprising a first surface, a second surface, and a third surface, the first surface, the second surface, and the third surface arranged in optical communication with each other, the first and the second surfaces arranged to form an angle of 60 degrees between them;
   a second part comprising a fourth surface, a fifth surface, and a sixth surface, the sixth surface in optical communication with the fourth and fifth surfaces, the fourth and the fifth surfaces arranged to form an angle of 120 degrees between them; and
   a beam splitting plate disposed between the third surface and the sixth surface, the beam splitting plate to split an incident laser beam emitted by the laser source, by reflecting a first portion of the laser beam and transmitting a second portion of the laser beam, the sixth surface to transmit the laser beam to the beam splitting plate and to transmit the second portion of the laser beam to the fifth surface, the third surface to transmit the second portion of the laser beam to the first surface,
   the first surface to define a first mirror arranged to receive the second portion of the laser beam from the beam splitting plate and reflect the second portion of the laser beam to the second surface;
   the second surface to define a second mirror arranged to receive the second portion of the laser beam from the first mirror and to direct the second portion of the laser beam to the third surface, the first and the second mirrors and the third surface arranged to define an optical path for the second portion of the laser beam with a length equal to, or greater than, a coherence length of the laser beam, the fourth surface to receive the laser beam and communicate the laser beam to the sixth surface, and the fifth surface to receive the second portion of the laser beam from the sixth surface and to receive the first portion of the laser beam from the third surface, an orientation between the first and second surface and between the fourth and fifth surfaces such that the first portion of the laser beam is transmitted through the fifth surface in parallel to the second portion of the laser beam.

7. The projection device according to claim 6, the light assembly comprising at least three laser sources.

8. The projection device according to claim 6, the light assembly positioned relative to the one or more MEMS mirrors, such that laser beams emitted from the light assemblies are incident on the surface of the MEMS mirror at an angle to the surface of the MEMS mirror which is always greater than half of the total optical angle of oscillation of the MEMS mirror as the MEMS mirror undergoes full oscillation.

9. The projection device of claim 6, comprising a plurality of light assemblies, the light assembly as one of the plurality of light assemblies, each of the plurality of light assemblies to comprise a light source, a beam splitter, a first mirror, and a second mirror.

10. A method comprising:
receiving a light beam at a beam splitter, the beam splitter disposed between a first part and a second part, the first part comprising a first surface, a second surface, and a third surface, the second part comprising a fourth surface, a fifth surface, and a sixth surface, the beam splitter disposed between the third and sixth surfaces, the first and the second surfaces arranged to form an angle of 60 degrees between them and the fourth and the fifth surfaces arranged to form an angle of 120 degrees between them;

splitting, at a beam splitter, the light beam into a first light beam portion and a second light beam portion;

reflecting, via the beam splitter, the first light beam portion to the fifth surface;

transmitting, via the beam splitter, the second light beam portion to the first surface;

reflecting, via at least a first mirror at the first surface, the second light beam portion to the second surface;

reflecting, via at least a second mirror at the second surface, the second light beam portion to the third surface, the first surface and the second surface to define an optical path, the optical path to have a length equal to, or greater than, a coherence length of the light beam;

transmitting the second light beam portion through the third surface, the beam splitter and the sixth surface to the fifth surface; and emitting, from the fifth surface, the first light beam portion and the second light beam portion.

11. The method of claim 10, comprising emitting the light beam from a laser light source.

12. The apparatus of claim 1, the beam splitting plate to split the laser beam into the first part having a first polarization and the second part having a second polarization, the first polarization different from the second polarization.

13. The apparatus of claim 1, the beam splitting plate to split the laser beam into the first part having a first intensity and the second part having a second intensity, the first intensity different from the second intensity.

14. The apparatus of claim 3, the coating on the third surface comprising one or more of Al, Au, $SiO_2$, $TiO_2$, $Al_2O_3$, $Ta_2O_5$, $MgF_2$, $LaF_3$ or $AlF_3$.

15. The projection device of claim 6, the third surface to comprise a coating to define the beam splitting plate.

16. The projection device of claim 15, the beam splitting plate to split the laser beam into the first part having a first polarization and the second part having a second polarization, the first polarization different from the second polarization.

17. The projection device of claim 16, the coating on the third surface comprising one or more of Al, Au, $SiO_2$, $TiO_2$, $Al_2O_3$, $Ta_2O_5$, $MgF_2$, $LaF_3$ or $AlF_3$.

18. The projection device of claim 6, the first surface and the second surface to comprise a coating to define the first and the second mirrors, respectively.

19. The projection device of claim 6, wherein the first part and the second part are each configured to have a triangular cross section, or a truncated-triangular cross section.

20. The projection device of claim 6, the beam splitting plate to split the laser beam into the first part having a first intensity and the second part having a second intensity, the first intensity different from the second intensity.

21. The method of claim 10, the third surface to comprise a coating to define the beam splitter.

22. The method of claim 21, comprising splitting, via the beam splitter, the light beam into the first part having a first polarization and the second part having a second polarization, the first polarization different from the second polarization.

23. The method of claim 22, the coating on the third surface comprising one or more of Al, Au, $SiO_2$, $TiO_2$, $Al_2O_3$, $Ta_2O_5$, $MgF_2$, $LaF_3$ or $AlF_3$.

24. The method of claim 10, the first surface and the second surface to comprise a coating to define the first and the second mirrors, respectively.

25. The method of claim 10, wherein the first part and the second part are each configured to have a triangular cross section, or a truncated-triangular cross section.

26. The method of claim 10, comprising splitting, via the beam splitter, the light beam into the first part having a first intensity and the second part having a second intensity, the first intensity different from the second intensity.

* * * * *